No. 743,507. PATENTED NOV. 10, 1903.
J. H. HOOPER.
VALVE STEM PACKING.
APPLICATION FILED AUG. 25, 1903.

NO MODEL.

Witnesses
F. G. Bruton
Mary S. Tooker

John H. Hooper, Inventor
By Edward Taggart
His Attorney

No. 743,507. Patented November 10, 1903.

UNITED STATES PATENT OFFICE.

JOHN H. HOOPER, OF BOYNE, MICHIGAN.

VALVE-STEM PACKING.

SPECIFICATION forming part of Letters Patent No. 743,507, dated November 10, 1903.

Application filed August 25, 1903. Serial No. 170,754. (No model.)

*To all whom it may concern:*

Be it known that I, JOHN H. HOOPER, a citizen of the United States, residing at Boyne, in the county of Charlevoix and State of Michigan, have invented new and useful Improvements in Valve-Stem Packings, of which the following is a specification.

This invention relates to a new and useful valve-stem packing; and the invention consists in the combination and arrangement of parts hereinafter described.

The objects of the invention are to furnish a packing which can be easily applied, which is durable, and which cannot readily get out of repair, thereby always making a water-tight joint. These objects I accomplish by means of the mechanism illustrated in the accompanying drawings, in which—

Figure 1:
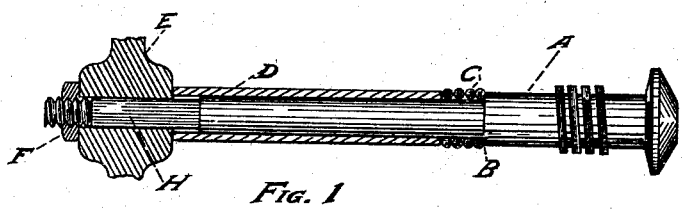
Figure 2:
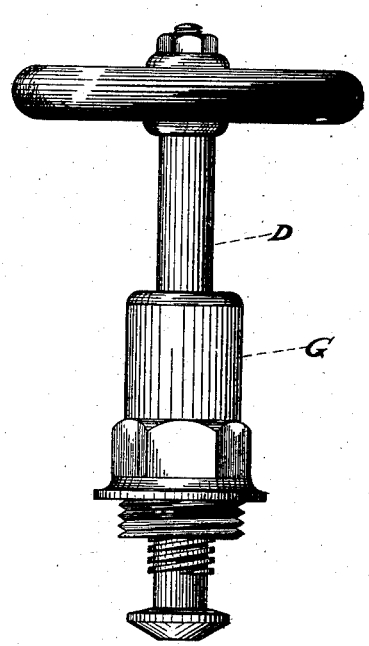
Figure 3:
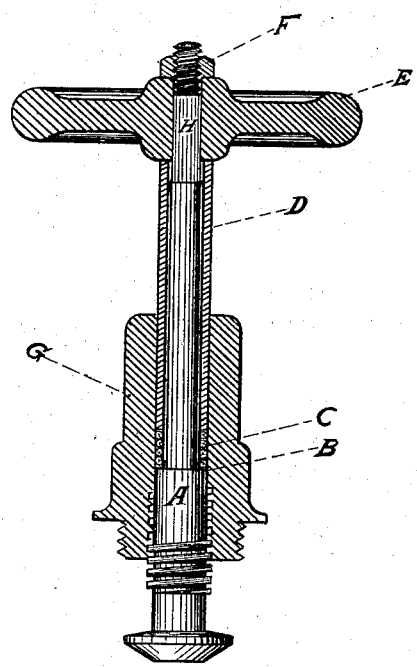

Figure 1 is a detached view of the valve-stem with a portion of the hand-wheel and gland in section. Fig. 2 shows an elevation of the packing complete. Fig. 3 shows a longitudinal sectional view through the center of Fig. 2.

Similar letters refer to similar parts throughout the several views.

The valve-stem A engages with the packing-box G in the ordinary manner. The upper part of the valve-stem is contracted, so as to form a shoulder B, as fully shown in Fig. 3. Resting against this shoulder B is the packing C. The stuffing-box G is bored out of uniform size, so that it leaves a space around the valve-stem, which is filled by the circular gland D, the circular gland D fitting into the stuffing-box G and having its lower end resting against the packing C. Slidably mounted upon the valve-stem is the hand-wheel E, by means of which the valve-stem can be rotated.

I prefer to make the upper end of the valve-stem square, as shown at H, so as to fit the square opening in the hand-wheel; but any suitable construction may be used whereby the hand-wheel is slidably mounted on the valve-stem in such a manner as to be rotated therewith.

The upper end of the valve-stem is provided with a screw-thread, with which engages the nut F, said nut F bearing against the hand-wheel E.

In order to compress the packing and cause the same to fill the entire chamber, so as to make a water-tight joint, the screw F is turned so as to press upon the hand-wheel E, which causes the hand-wheel to bear against the upper end of the circular gland D, pressing the gland downward, and thereby compressing the packing C between the lower end of the gland D and the shoulder E on the valve-stem. This causes the packing C to spread, so as to entirely fill the opening and always make a water-tight joint. By this construction I form a chamber for the packing by the construction of the valve-stem itself, and bearing on the valve-stem by means of the shoulder B, which retains the packing in place, and by the use of the circular gland D, the hand-wheel E, slidably mounted upon the stem, and the nut F, I produce a packing for the valve-stem which can be readily repaired, as the packing is always accessible by merely removing the nut F and the parts held in position thereby.

Having thus described my invention, what I claim to have invented, and desire to secure by Letters Patent, is—

The herein-described valve-stem packing, consisting of the valve-stem provided with a shoulder, a stuffing-box, with which said valve-stem engages, a packing surrounding the valve-stem and engaging said shoulder, a cylindrical gland bearing against the packing, a hand-wheel slidably mounted upon the valve-stem and abutting against the upper end of said gland, and an adjustable nut engaging with the end of the valve-stem, and adapted when adjusted in one direction to compress the packing between the shoulder and the lower end of the cylindrical gland, substantially as described.

In testimony whereof I have hereunto set my hand in presence of two subscribing witnesses.

JOHN H. HOOPER.

Witnesses:
WM. N. LEWIS,
R. K. CRANE.